(12) United States Patent
Sun (10) Patent No.: US 11,914,107 B2
(45) Date of Patent: Feb. 27, 2024

(54) CAMERA OPTICAL LENS

(71) Applicant: Raytech Optical (Changzhou) Co., Ltd, Changzhou (CN)

(72) Inventor: Wen Sun, Shenzhen (CN)

(73) Assignee: Raytech Optical (Changzhou) Co., Ltd, Changzhou (CN)

( * ) Notice: Subject to any disclaimer, the term of this patent is extended or adjusted under 35 U.S.C. 154(b) by 617 days.

(21) Appl. No.: 17/134,527

(22) Filed: Dec. 28, 2020

(65) Prior Publication Data

US 2022/0082799 A1 Mar. 17, 2022

(30) Foreign Application Priority Data

Sep. 15, 2020 (CN) .......................... 202010964459.9

(51) Int. Cl.
*G02B 9/64* (2006.01)
*G02B 13/06* (2006.01)
*G02B 13/00* (2006.01)

(52) U.S. Cl.
CPC ........... *G02B 13/0045* (2013.01); *G02B 9/64* (2013.01); *G02B 13/06* (2013.01)

(58) Field of Classification Search
CPC ...... G02B 13/0045; G02B 9/64; G02B 13/06; G02B 27/0025; G02B 15/146; G02B 15/1461
See application file for complete search history.

(56) References Cited

U.S. PATENT DOCUMENTS

| | | | | |
|---|---|---|---|---|
| 2020/0393652 A1* | 12/2020 | Kuo | .......................... | G02B 9/64 |
| 2020/0393653 A1* | 12/2020 | Chen | ................... | G02B 13/0045 |
| 2021/0396968 A1* | 12/2021 | Yang | ................... | G02B 13/0045 |

FOREIGN PATENT DOCUMENTS

| | | | | | |
|---|---|---|---|---|---|
| CN | 111679398 A | * | 9/2020 | ......... | G02B 13/0045 |
| CN | 111679398 A | | 9/2020 | | |
| JP | 1988247713 A | | 10/1988 | | |
| JP | 1994027373 A | | 2/1994 | | |
| JP | 2001337265 A | | 12/2001 | | |
| JP | 2011113052 A | | 6/2011 | | |
| JP | 2011128273 A | | 6/2011 | | |
| JP | 2013025157 A1 | | 2/2013 | | |
| JP | 2013083783 A1 | | 5/2013 | | |
| TW | I691751 B | | 4/2020 | | |

* cited by examiner

*Primary Examiner* — Mustak Choudhury
*Assistant Examiner* — K Muhammad
(74) *Attorney, Agent, or Firm* — W&G Law Group (57) ABSTRACT

The present invention provides an optical camera lens, including, from an object side to an image side, a first lens, a second lens having a positive refractive power, a third lens, a fourth lens, a fifth lens, a sixth lens, a seventh lens, an eighth lens, and a ninth lens, and satisfying: $1.80 \leq f1/f \leq 3.20$; and $2.00 \leq d3/d4 \leq 8.00$, where f denotes a focal length of the optical camera lens, f1 denotes a focal length of the first lens, d3 denotes an on-axis thickness of the second lens, and d4 denotes an on-axis distance from an image side surface of the second lens to an object side surface of the third lens. The optical camera lens meets design requirements of a large aperture, a wide angle, and ultra-thinness while having good optical performance.

10 Claims, 7 Drawing Sheets

CAMERA OPTICAL LENS

TECHNICAL FIELD

The present invention relates to the field of optical lenses, and in particular, to an optical camera lens applicable to portable terminal devices such as smart phones and digital cameras, as well as camera devices such as monitors and PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain better imaging quality, a traditional lens mounted in a mobile phone camera usually adopts a three-lens or four-lens structure and even a five-lens or six-lens structure. However, with the development of technologies and the increase in users' diversified demands, a nine-lens structure gradually appears in lens design as the pixel area of the photosensitive devices is constantly reduced and the requirements on imaging quality of the system is constantly increased. Although the common nine-lens structure has good optical performance, its refractive power, lens spacing, and lens shape settings are still unreasonable in some extent. As a result, the lens structure cannot meet design requirements of a large aperture, ultra-thinness, and a wide angle while having good optical performance.

SUMMARY

In view of the above problems, a purpose of the present invention is to provide an optical camera lens that meets design requirements of a large aperture, ultra-thinness, and a wide angle while having good optical performance.

In order to solve the above technical problems, an embodiment of the present invention provides an optical camera lens. The optical camera lens includes, from an object side to an image side, a first lens, a second lens having a positive refractive power, a third lens, a fourth lens, a fifth lens, a sixth lens, a seventh lens, an eighth lens, and a ninth lens, and satisfies following conditions: $1.80 \leq f1/f \leq 3.20$; and $2.00 \leq d3/d4 \leq 8.00$, where f denotes a focal length of the optical camera lens, f1 denotes a focal length of the first lens, f2 denotes an on-axis thickness of the second lens, and d4 denotes an on-axis distance from an image side surface of the second lens to an object side surface of the third lens.

In an improved embodiment, the optical camera lens further satisfies following condition: $2.50 \leq R12/R11 \leq 4.50$, where R11 denotes a central curvature radius of an image side surface of the sixth lens, and R12 denotes a central curvature radius of an image side surface of the sixth lens.

In an improved embodiment, the optical camera lens further satisfies following conditions: $-20.09 \leq (R1+R2)/(R1-R2) \leq -2.82$; and $0.04 \leq d1/TTL \leq 0.13$, where R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

In an improved embodiment, the optical camera lens further satisfies following conditions: $0.76 \leq f2/f \leq 3.19$; $-4.09 \leq (R3+R4)/(R3-R4) \leq -1.10$; and $0.03 \leq d3/TTL \leq 0.09$, where f2 denotes a focal length of the second lens, R3 denotes a central curvature radius of an object side surface of the second lens, R4 denotes a central curvature radius of the image side surface of the second lens, and TTL denotes a total optical length from an object side surface of the first lens to an image plane of the camera optical lens along an optic axis.

In an improved embodiment, the optical camera lens further satisfies following conditions: $-6.09 \leq f3/f \leq -1.86$; $2.64 \leq (R5+R6)/(R5-R6) \leq 8.12$; and $0.02 \leq d5/TTL \leq 0.05$, where f3 denotes a focal length of the third lens, R5 denotes a central curvature radius of the object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

In an improved embodiment, the optical camera lens further satisfies following conditions: $-323.37 \leq f4/f \leq 140.20$; $-66.38 \leq (R7+R8)/(R7-R8) \leq 61.43$; and $0.03 \leq d7/TTL \leq 0.10$, where f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

In an improved embodiment, the optical camera lens further satisfies following conditions: $1.01 \leq f5/f \leq 3.08$; $0.22 \leq (R9+R10)/(R9-R10) \leq 0.90$; and $0.02 \leq d9/TTL \leq 0.07$, where f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis.

In an improved embodiment, the optical camera lens further satisfies following conditions: $-4.96 \leq f6/f \leq -1.04$; $-4.66 \leq (R11+R12)/(R11-R12) \leq -1.09$; and $0.02 \leq d11/TTL \leq 0.07$, where f6 denotes a focal length of the sixth lens, R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object side surface of the first lens to an image plane of the camera optical lens along an optic axis.

In an improved embodiment, the optical camera lens further satisfies following conditions: $-14.32 \leq f7/f \leq 28.26$; $-10.94 \leq (R13+R14)/(R13-R14) \leq 19.74$; and $0.02 \leq d13/TTL \leq 0.07$, where f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens, and TTL denotes a total optical length from an object side surface of the first lens to an image plane of the camera optical lens along an optic axis.

In an improved embodiment, the optical camera lens further satisfies following conditions: $0.51 \leq f8/f \leq 1.56$; $-2.23 \leq (R15+R16)/(R15-R16) \leq -0.69$; and $0.04 \leq d15/TTL \leq 0.12$, where f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens, and TTL denotes a total optical length from an object side surface of the first lens to an image plane of the camera optical lens along an optic axis.

In an improved embodiment, the optical camera lens further satisfies following conditions: $-1.46 \leq f9/f \leq -0.47$; $0.14 \leq (R17+R18)/(R17-R18) \leq 0.68$; and $0.04 \leq d17/TTL \leq 0.12$, where f9 denotes a focal length of the ninth lens, R17 denotes a central curvature radius of an object side surface of the ninth lens, R18 denotes a central curvature radius of an image side surface of the ninth lens, d17 denotes an on-axis thickness of the ninth lens, and TTL denotes a total optical length from an object side surface of the first lens to an image plane of the camera optical lens along an optic axis.

The present invention has at least the following beneficial effects: the optical camera lens according to the present invention has excellent optical performance while satisfying design requirements of ultra-thinness, a wide angle and a large aperture, and is especially suitable for camera lens assemblies of mobile phones and WEB camera lenses formed by imaging elements such as CCD and CMOS for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figure and the embodiments. It should be understood the specific embodiments described hereby is only to explain the invention, not intended to limit the invention.

Embodiment 1

Figure 1:
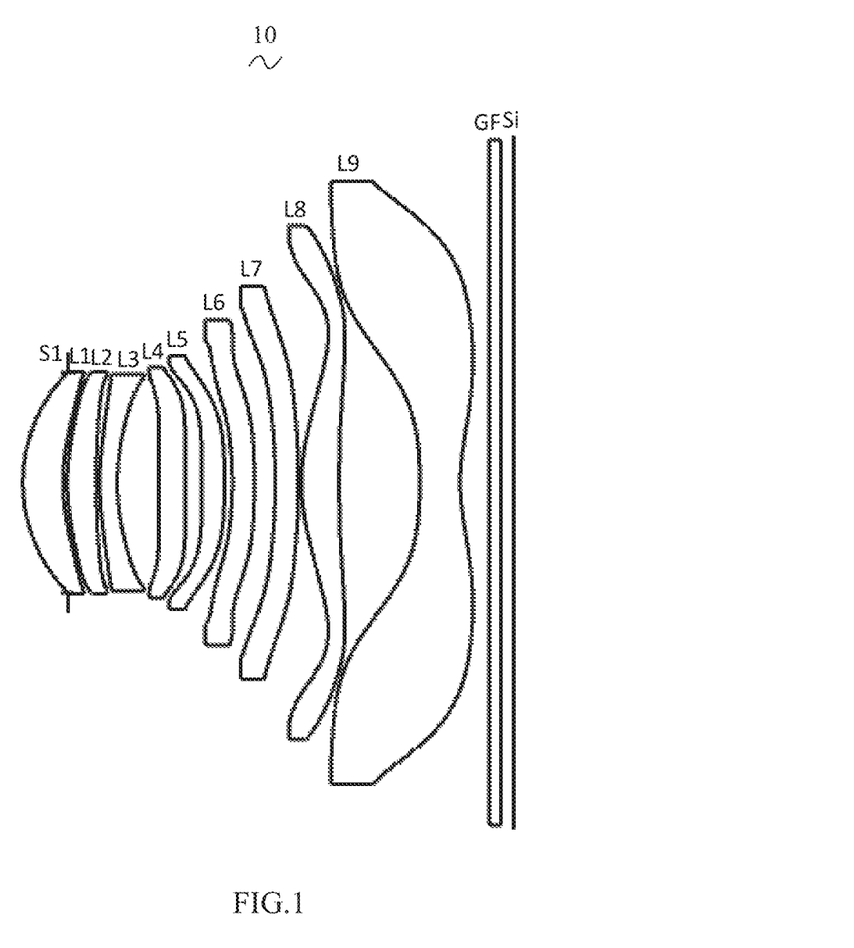
FIG. 1 is a schematic structural diagram of an optical camera lens according to Embodiment 1 of the present invention.

Referring to the figures, the present invention provides an optical camera lens 10. FIG. 1 illustrates the optical camera lens 10 according to Embodiment 1 of the present invention. The optical camera lens 10 includes nine lenses. Specifically, the optical camera lens 10 sequentially includes, from an object side to an image side, an aperture S1, a first lens L1, a second lens L2, a third lens L3, a fourth lens L4, a fifth lens L5, a sixth lens L6, a seventh lens L7, an eighth lens L8, and a ninth lens L9. An optical element such as an optical filter GF may be provided between the ninth lens L9 and an image plane Si.

In this embodiment, the first lens L1 has a positive refractive power, the second lens L2 has a positive refractive power, the third lens L3 has a negative refractive power, the fourth lens L4 has a negative refractive power, the fifth lens L5 has a positive refractive power, the sixth lens L6 has a negative refractive power, the seventh lens L7 has a negative refractive power, the eighth lens L8 has a positive refractive power, and the ninth lens L9 has a negative refractive power. It may be understood that in other embodiments, each of the third lens L3, the fourth lens L4, the fifth lens L5, the sixth lens L6, the seventh lens L7, the eighth lens L8, and the ninth lens L9 may have a refractive power different from that defined above.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, the eighth lens L8 is made of a plastic material, and the ninth lens L9 is made of a plastic material.

In this embodiment, a focal length of the optical camera lens 10 is defined as f, and a focal length of the first lens L1 is f1. The cameral optical lens 10 satisfies the following condition: $1.80 \leq f1/f \leq 3.20$, which specifies a ratio of the focal length of the first lens to the focal length of the optical camera lens. Within the conditional range, it is conducive to correcting system aberration and improving imaging quality.

A focal length of the second lens L2 is defined as f2, which satisfies the following condition: $0 \leq f2$, which specifies a range of the focal length of the second lens. Within the conditional range, it is conducive to improving image quality.

An on-axis thickness of the second lens L2 is defined as d3, and an on-axis distance from an image side surface of the second lens L2 to an object side surface of the third lens L3 is defined as d4. The cameral optical lens 10 further satisfies the following condition: 2.00≤d3/d4≤8.00. When d3/d4 satisfies the condition, it is conducive to lens processing and lens assembling.

A central curvature radius of an object side surface of the sixth lens is defined as R11, and a central curvature radius of an image side surface of the sixth lens is defined as R12. The camera optical lens 10 further satisfies the following condition: 2.50≤R12/R11≤4.50, which specifies the shape of the sixth lens. Within the specified conditional range, a deflection degree of light passing through the lens can be alleviated, thereby effectively reducing the aberration.

In this embodiment, an object side surface of the first lens L1 is a convex surface at a paraxial position, and an image side surface of the first lens L1 is a concave surface at a paraxial position.

A central curvature radius of the object side surface of the first lens L1 is defined as R1, and a central curvature radius of the image side surface of the first lens L1 is R2. The camera optical lens 10 further satisfies the following condition: −20.09≤(R1+R2)/(R1−R2)≤−2.82. The shape of the first lens L1 is reasonably controlled, so that the first lens L1 can effectively correct spherical aberration of the system. As an example, −12.56≤(R1+R2)/(R1−R2)≤−3.53.

An on-axis thickness of the first lens L1 is denoted by d1, and a total optical length from the object side surface of the first lens to the image plane of the camera optical lens 10 along an optic axis is denoted by TTL. The camera optical lens 10 further satisfies the following condition: 0.04≤d1/TTL≤0.13. Within this conditional range, it is conducive to achieving ultra-thinness. As an example, 0.07≤d1/TTL≤0.11.

In this embodiment, the object side surface of the second lens L2 is a convex surface at a paraxial position, and the image side surface of the second lens L2 is a concave surface at a paraxial position.

The focal length of the optical camera lens 10 is defined as f, and a focal length of the second lens L2 is defined as f2. The camera optical lens 10 further satisfies the following condition: 0.76≤f2/f≤3.19. The positive refractive power of the second lens L2 is controlled within a reasonable range, so as to facilitating correcting aberration of the optical system. As an example, 1.22≤f2/f≤2.55.

A central curvature radius of an object side surface of the second lens L2 is defined as R3, and a central curvature radius of an image side surface of the second lens L2 is defined as R4. The camera optical lens 10 further satisfies the following condition: −4.09≤(R3+R4)/(R3−R4)≤−1.10, which specifies the shape of the second lens L2. Within this range, it is conducive to correcting longitudinal aberration with the development of ultra-thin and wide-angle lenses. As an example, −2.55≤(R3+R4)/(R3−R4)≤−1.37.

An on-axis thickness of the second lens L2 is defined as d3, and the total optical length from an object side surface of the first lens to an image plane of the camera optical lens 10 along the optic axis is defined as TTL. The camera optical lens 10 further satisfies the following condition: 0.03≤d3/TTL≤0.09. Within this conditional range, it is conducive to achieving ultra-thinness. As an example, 0.04≤d3/TTL≤0.07.

In this embodiment, the object side surface of the third lens L3 is a convex surface at a paraxial position, and the image side surface thereof is a concave surface at a paraxial position.

The focal length of the optical camera lens 10 is defined as f, and a focal length of the third lens L3 is defined as f3. The camera optical lens 10 further satisfies the following condition: −6.09≤f3/f≤−1.86. By reasonably allocating the refractive power, the system is enabled to have better imaging quality and low sensitivity. As an example, −3.80≤f3/f≤−2.33.

A central curvature radius of an object side surface of the third lens L3 is R5, and a central curvature radius of an image side surface of the third lens L3 is R6. The camera optical lens 10 further satisfies the following condition: 2.64≤(R5+R6)/(R5−R6)≤8.12, which specifies the shape of the third lens. Within this specified range, a deflection degree of light passing through the lens can be alleviated, thereby effectively reducing the aberration. As an example, 4.22≤(R5+R6)/(R5−R6)≤6.49.

An on-axis thickness of the third lens L3 is defined as d5, and a total optical length from an object side surface of the first lens to an image plane of the camera optical lens 10 along the optic axis is defined as TTL. The camera optical lens 10 further satisfies the following condition: 0.02≤d5/TTL≤0.05. Within this range, it is conducive to achieving ultra-thinness. As an example, 0.03≤d5/TTL≤0.04.

In this embodiment, the object side surface of the fourth lens L4 is a convex surface at a paraxial position, and the image side surface of the fourth lens L4 is a concave surface at a paraxial position.

The focal length of the optical camera lens 10 is defined as f, and a focal length of the fourth lens L4 is defined as f4. The camera optical lens 10 further satisfies the following condition: −323.37≤f4/f≤140.20, which specifies a ratio of the focal length of the fourth lens to the focal length of the optical camera lens. Within this range, it is conducive to improving performance of the optical system. As an example, −202.11≤f4/f≤112.16.

A central curvature radius of an object side surface of the fourth lens L4 is defined as R7, and a central curvature radius of an image side surface of the fourth lens L4 is defined as R8. The camera optical lens 10 further satisfies the following condition: −66.38≤(R7+R8)/(R7−R8)≤61.43, which specifies a shape of the fourth lens L4. Within this range, it is conducive to correcting the problems such as off-axis aberration with the development of ultra-thinness and wide angle. As an example, −41.49≤(R7+R8)/(R7−R8)≤49.14.

An on-axis thickness of the fourth lens L4 is d7, and the total optical length from an object side surface of the first lens to an image plane of the camera optical lens 10 along the optic axis is defined as TTL. The camera optical lens 10 further satisfies the following condition: 0.03≤d7/TTL≤0.10. Within this range, it is conducive to achieving ultra-thinness. As an example, 0.04≤d7/TTL≤0.08.

In this embodiment, an object side surface of the fifth lens L5 is a convex surface at a paraxial position, and an image side surface of the fifth lens L5 is a convex surface at a paraxial position.

The focal length of the optical camera lens 10 is defined as f, and a focal length of the fifth lens L5 is defined as f5. The camera optical lens 10 further satisfies the following condition: 1.01≤f5/f≤3.08. The limitation on the fifth lens L5 can effectively smooth a light angle of the optical camera lens 10, and reduce the tolerance sensitivity. As an example, 1.62≤f5/f≤2.46.

A central curvature radius of the object side surface of the fifth lens L5 is R9, and a central curvature radius of the image side surface of the fifth lens L5 is R10. The camera optical lens 10 further satisfies the following condition: 0.22≤(R9+R10)/(R9−R10)≤0.90, which specifies the shape of the fifth lens L5. Within this range, it is conducive to correcting the problems such as off-axis aberration with the development of ultra-thinness and wide angle. As an example, $0.36 \leq (R9+R10)/(R9-R10) \leq 0.72$.

An on-axis thickness of the fifth lens L5 is defined as d9, and the total optical length from an object side surface of the first lens to an image plane of the camera optical lens 10 along the optic axis is defined as TTL. The camera optical lens 10 further satisfies the following condition: $0.02 \leq d9/TTL \leq 0.07$. Within this range, it is conducive to achieving ultra-thinness. As an example, $0.04 \leq d9/TTL \leq 0.06$.

In this embodiment, an object side surface of the sixth lens L6 is a concave surface at a paraxial position, and an image side surface of the sixth lens L6 is a convex surface at a paraxial position.

A focal length of the optical camera lens 10 is defined as f, and a focal length of the sixth lens L6 is defined as f6. The camera optical lens 10 further satisfies the following condition: $-4.96 \leq f6/f \leq -1.04$. By reasonably allocating the refractive power, the system is enabled to have better imaging quality and low sensitivity. As an example, $-3.10 \leq f6/f \leq -1.30$ is satisfied.

A central curvature radius of the object side surface of the sixth lens L6 is R11, and a central curvature radius of the image side surface of the sixth lens L6 is R12. The camera optical lens 10 further satisfies the following condition: $-4.66 \leq (R11+R12)/(R11-R12) \leq -1.09$, which specifies a shape of the sixth lens L6. Within this range, it is conducive to correcting the problems such as off-axis aberration with the development of ultra-thinness and wide angle. As an example, $-2.91 \leq (R11+R12)/(R11-R12) \leq -1.37$ is satisfied.

An on-axis thickness of the sixth lens L6 is defined as d11, and the total optical length from an object side surface of the first lens to an image plane of the camera optical lens 10 along the optic axis is defined as TTL. The camera optical lens 10 further satisfies the following condition: $0.02 \leq d11/TTL \leq 0.07$. Within the range of the condition, it is conducive to achieving ultra-thinness. As an example, $0.04 \leq d11/TTL \leq 0.05$.

In this embodiment, an object side surface of the seventh lens L7 is a concave surface at a paraxial position, and an image side surface of the seventh lens L7 is a convex surface at a paraxial position.

The focal length of the optical camera lens 10 is defined as f, and a focal length of the seventh lens L7 is defined as f7. The camera optical lens 10 further satisfies the following condition: $-14.32 \leq f7/f \leq 28.26$. Within the range of this condition, by reasonably allocating the refractive power, the system is enabled to have better imaging quality and low sensitivity. As an example, $-8.95 \leq f7/f \leq 22.61$.

A central curvature radius of an object side surface of the seventh lens L7 is defined as R13, and a central curvature radius of an image side surface of the seventh lens L7 is defined as R14. The camera optical lens 10 further satisfies the following condition: $-10.94 \leq (R13+R14)/(R13-R14) \leq 19.74$, which specifies the shape of the seventh lens L7. Within the range of this condition, it is conducive to correcting the problems such as off-axis aberration with the development of ultra-thinness and wide angle. As an example, $-6.84 \leq (R13+R14)/(R13-R14) \leq 15.79$ is satisfied.

An on-axis thickness of the seventh lens L7 is d13, and the total optical length from an object side surface of the first lens to an image plane of the camera optical lens 10 along the optic axis is defined as TTL. The camera optical lens 10 further satisfies the following condition: $0.02 \leq d13/TTL \leq 0.07$. Within the range of this condition, it is conducive to achieving ultra-thinness. As an example, $0.04 \leq d13/TTL \leq 0.06$.

In this embodiment, an object side surface of the eighth lens L8 is a convex surface at a paraxial position, and an image side surface of the eighth lens L8 is a concave surface at a paraxial position.

The focal length of the optical camera lens 10 is defined as f, and a focal length of the eighth lens L8 is defined as f8. The camera optical lens 10 further satisfies the following condition: $0.51 \leq f8/f \leq 1.56$. By reasonably allocating the refractive power, the system is enabled to have better imaging quality and low sensitivity. As an example, $0.81 \leq f8/f \leq 1.25$.

A central curvature radius of the image side surface of the eighth lens L8 is defined as R15, and a central curvature radius of the image side surface of the eighth lens L8 is defined as R16. The camera optical lens 10 further satisfies the following condition: $-2.23 \leq (R15+R16)/(R15-R16) \leq -0.69$, which specifies a shape of the eighth lens. Within the range of this condition, it is conducive to correcting the problems such as off-axis aberration with the development of ultra-thinness and wide angle. As an example, $-1.39 \leq (R15+R16)/(R15-R16) \leq -0.86$.

An on-axis thickness of the eighth lens L8 is defined as d15, and the total optical length from an object side surface of the first lens to an image plane of the camera optical lens 10 along the optic axis is defined as TTL. The camera optical lens 10 further satisfies the following condition: $0.04 \leq d15/TTL \leq 0.12$. Within the range of this condition, it is conducive to achieving ultra-thinness. As an example, $0.06 \leq d15/TTL \leq 0.10$.

In this embodiment, an object side surface of the ninth lens L9 is a concave surface at a paraxial position, and an image side surface of the ninth lens L9 is a concave surface at a paraxial position. It may be understood that in other embodiments, surface types (concave or convex) of the object side surfaces and the image side surfaces of the first lens L1, the second lens L2, the third lens L3, the fourth lens L4, the fifth lens L5, the sixth lens L6, the seventh lens L7, the eighth lens L8, and the ninth lens L9 may be set to be different from those defined above.

The focal length of the optical camera lens 10 is defined as f, and a focal length of the ninth lens L9 is defined as f9. The camera optical lens 10 further satisfies the following condition: $-1.46 \leq f9/f \leq -0.47$. By reasonably allocating the refractive power, the system is enabled to have better imaging quality and low sensitivity. As an example, $-0.91 \leq f9/f \leq -0.59$.

A central curvature radius of the object side surface of the ninth lens L9 is defined as R17, and a central curvature radius of the image side surface of the ninth lens L9 is defined as R18. The camera optical lens 10 further satisfies the following condition: $0.14 \leq (R17+R18)/(R17-R18) \leq 0.68$, which specifies a shape of the ninth lens. Within the range of this condition, it is conducive to correcting the problems such as off-axis aberration with the development of ultra-thinness and wide angle. As an example, $0.22 \leq (R17+R18)/(R17-R18) \leq 0.54$.

An on-axis thickness of the ninth lens L9 is defined as d17, and the total optical length from an object side surface of the first lens to an image plane of the camera optical lens 10 along the optic axis is defined as TTL. The camera optical lens 10 further satisfies the following condition: $0.04 \leq d17/TTL \leq 0.12$. Within the range of this condition, it is conducive to achieving ultra-thinness. As an example, $0.06 \leq d17/TTL \leq 0.10$.

In this embodiment, an image height of the optical camera lens 10 is defined as IH, and the total optical length from an object side surface of the first lens to an image plane of the camera optical lens 10 along the optic axis is defined as TTL. The cameral optical lens 10 further satisfies the following condition: TTL/IH≤1.42, thereby facilitating ultra-thinness.

In this embodiment, a field of view (FOV) of the optical camera lens 10 is greater than or equal to 80°, thereby implementing a wide angle. As an example, the field of view FOV of the optical camera lens 10 is greater than or equal to 82°.

In this embodiment, an F number (FNO) of the optical camera lens 10 is smaller than or equal to 1.80, thereby implementing a large aperture and good imaging performance of the lens. As an example, the F number FNO of the optical camera lens 10 is smaller than or equal to 1.70.

When the above conditions are satisfied, the optical camera lens 10 can meet design requirements of a large aperture, a wide angle, and ultra-thinness while having good optical performance. According to the characteristics of the optical camera lens 10, the optical camera lens 10 is particularly suitable for camera lens assemblies of mobile phones and WEB camera lenses formed by imaging elements such as CCD and CMOS for high pixels.

The optical camera lens 10 of the present invention will be described below with examples. Symbols listed in the examples are shown as below. The focal length, the on-axis distance, the central curvature radius, the on-axis thickness, the inflection point position, and the stagnation point position are all expressed in unit of mm.

TTL: total optical length (an on-axis distance from the object side surface of the first lens L1 to the image plane Si), in units of mm.

F number (FNO): a ratio of an effective focal length of the optical camera lens to an entrance pupil diameter.

As an example, the object side surface and/or the image side surface of the lens may also be provided with an inflection point and/or a stagnation point to meet high-quality imaging requirements. For specific implementation schemes, reference may be made to the following description.

Table 1 and Table 2 show design data of the optical camera lens 10 according to Embodiment 1 of the present invention.

TABLE 1

|  | R |  | d | nd |  | vd |
| --- | --- | --- | --- | --- | --- | --- |
| S1 | ∞ | d0= | −0.773 |  |  |  |
| R1 | 2.926 | d1= | 0.695 | nd1 | 1.5444 v1 | 56.43 |
| R2 | 3.879 | d2= | 0.074 |  |  |  |
| R3 | 4.372 | d3= | 0.500 | nd2 | 1.5444 v2 | 56.43 |
| R4 | 17.928 | d4= | 0.063 |  |  |  |
| R5 | 5.502 | d5= | 0.300 | nd3 | 1.6800 v3 | 18.40 |
| R6 | 3.779 | d6= | 0.715 |  |  |  |
| R7 | 25.927 | d7= | 0.455 | nd4 | 1.5444 v4 | 56.43 |
| R8 | 24.691 | d8= | 0.283 |  |  |  |
| R9 | 26.805 | d9= | 0.400 | nd5 | 1.5444 v5 | 56.43 |
| R10 | −10.275 | d10= | 0.134 |  |  |  |
| R11 | −5.991 | d11= | 0.380 | nd6 | 1.6023 v6 | 28.29 |
| R12 | −14.992 | d12= | 0.366 |  |  |  |
| R13 | −10.342 | d13= | 0.400 | nd7 | 1.6800 v7 | 18.40 |
| R14 | −15.327 | d14= | 0.051 |  |  |  |
| R15 | 3.721 | d15= | 0.656 | nd8 | 1.5444 v8 | 56.43 |
| R16 | 268.037 | d16= | 1.390 |  |  |  |
| R17 | −9.852 | d17= | 0.697 | nd9 | 1.5444 v9 | 56.43 |
| R18 | 3.773 | d18= | 0.500 |  |  |  |
| R19 | ∞ | d19= | 0.210 | ndg | 1.5168 vg | 64.17 |
| R20 | ∞ | d20= | 0.207 |  |  |  |

Meanings of the symbols are defined as follows.
S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of the object side surface of the eighth lens L8;
R16: central curvature radius of the image side surface of the eighth lens L8;
R17: central curvature radius of the object side surface of the ninth lens L9;
R18: central curvature radius of the image side surface of the ninth lens L9;
R19: central curvature radius of the object side surface of the optical filter GF;
R20: central curvature radius of the image side surface of the optical filter GF;
d: on-axis thickness of a lens, on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;

d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the ninth lens L9;
d17: on-axis thickness of the ninth lens L9;
d18: on-axis distance from the image side surface of the ninth lens L9 to the object side surface of the optical filter GF;
d19: on-axis thickness of the optical filter GF;
d20: on-axis distance from the image side surface of the optical filter GF to the image plane Si;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
nd7: refractive index of d-line of the seventh lens L7;
nd8: refractive index of d-line of the eighth lens L8;
nd9: refractive index of d-line of the ninth lens L9;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
v9: abbe number of the ninth lens L9; and
vg: abbe number of the optical filter GF.

Table 2 shows aspherical surface data of the lenses in the optical camera lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | 5.9585E−02 | −6.5076E−04 | 1.6555E−04 | 9.8866E−06 | −2.1605E−06 | −1.2750E−06 |
| R2 | −4.7623E+00 | 1.9565E−04 | −2.5231E−03 | −1.5161E−03 | 1.0816E−03 | −2.7288E−04 |
| R3 | −8.4654E+00 | 6.5198E−03 | −4.7141E−03 | −4.1929E−04 | 6.5713E−04 | −9.5750E−05 |
| R4 | 1.0846E−01 | −3.4524E−03 | 6.9076E−03 | −4.0202E−03 | 1.4802E−03 | −3.1691E−04 |
| R5 | −2.3474E+00 | −2.3298E−02 | 1.0614E−02 | −3.8951E−03 | 6.2716E−04 | 1.7718E−05 |
| R6 | 1.5365E+00 | −2.3583E−02 | 5.4519E−03 | −9.6860E−03 | −2.4704E−03 | 1.8256E−04 |
| R7 | −5.4686E−02 | −1.3809E−02 | 3.3845E−03 | −4.0607E−03 | 1.9584E−03 | −6.8218E−04 |
| R8 | 9.9231E+00 | −2.6691E−02 | 1.0799E−02 | −8.8164E−03 | 4.2121E−03 | −1.3409E−03 |
| R9 | 1.6528E−01 | −3.5413E−02 | −4.3535E−03 | 8.6702E−03 | −9.9717E−03 | 5.9014E−03 |
| R10 | 6.3102E+00 | 1.0165E−02 | −3.8303E−02 | 1.7389E−02 | −5.5836E−03 | 1.9939E−03 |
| R11 | 7.7187E−01 | 3.8475E−02 | −5.2650E−02 | 2.8068E−02 | −7.4528E−03 | 9.7733E−04 |
| R12 | 5.9878E+00 | −2.5794E−03 | −2.9636E−02 | 2.6089E−02 | −1.1689E−02 | 3.0884E−03 |
| R13 | 4.1915E+00 | 3.0544E−03 | −5.3405E−02 | 6.2790E−03 | −3.2703E−03 | 8.7852E−04 |
| R14 | 9.4545E+00 | −8.4024E−03 | 4.3253E−03 | 1.3161E−04 | −6.6357E−03 | 2.0605E−04 |
| R15 | −6.6150E−01 | −1.0831E−02 | −1.9660E−03 | 9.1373E−04 | −1.7145E−04 | 1.7458E−05 |
| R16 | −1.0000E+01 | 2.2936E−02 | −1.1195E−02 | 2.7574E−03 | −3.9368E−04 | 3.3470E−05 |
| R17 | −8.0938E+00 | −3.2265E−02 | 3.7849E−03 | −1.5547E−04 | 4.8219E−06 | −6.7354E−07 |
| R18 | −9.7355E−01 | −3.4728E−02 | 5.9698E−03 | −8.1979E−04 | 8.3493E−05 | −5.9187E−06 |

| | Cone coefficient | Aspherical coefficient | | | |
|---|---|---|---|---|---|
| | k | A14 | A16 | A18 | A20 |
| R1 | 5.9585E−02 | 0.0000E+00 | 0.0000E+00 | 0.0000E+00 | 0.0000E+00 |
| R2 | −4.7623E+00 | 4.7627E−05 | −4.2645E−06 | 0.0000E+00 | 0.0000E+00 |
| R3 | −8.4654E+00 | 6.1790E−06 | 0.0000E+00 | 0.0000E+00 | 0.0000E+00 |
| R4 | 1.0846E−01 | 3.2114E−05 | 2.1780E−07 | 0.0000E+00 | 0.0000E+00 |
| R5 | −2.3474E+00 | −9.7875E−06 | 0.0000E+00 | 0.0000E+00 | 0.0000E+00 |
| R6 | 1.5365E+00 | −2.0049E−05 | 0.0000E+00 | 0.0000E+00 | 0.0000E+00 |
| R7 | −5.4686E−02 | 1.2359E−04 | −6.6464E−06 | 0.0000E+00 | 0.0000E+00 |
| R8 | 9.9231E+00 | 2.1574E−04 | −1.1910E−05 | 0.0000E+00 | 0.0000E+00 |
| R9 | 1.6528E−01 | −1.8454E−03 | 2.9051E−04 | −1.7946E−05 | 0.0000E+00 |
| R10 | 6.3102E+00 | −5.4016E−04 | 7.6465E−05 | −4.1514E−06 | 0.0000E+00 |
| R11 | 7.7187E−01 | −2.0063E−05 | −1.1758E−05 | 1.5079E−06 | −6.1664E−08 |
| R12 | 5.9878E+00 | −4.9031E−04 | 4.5974E−05 | −2.3530E−06 | 5.0819E−08 |
| R13 | 4.1915E+00 | −1.3445E−04 | 1.1914E−05 | −5.7019E−07 | 1.1404E−08 |
| R14 | 9.4545E+00 | −3.0003E−05 | 2.3583E−06 | −9.6627E−08 | 1.6209E−09 |
| R15 | −6.6150E−01 | −1.0877E−06 | 4.3204E−08 | −1.0224E−09 | 1.0890E−11 |
| R16 | −1.0000E+01 | −1.7057E−06 | 5.0394E−08 | −7.7503E−10 | 4.5336E−12 |
| R17 | −8.0938E+00 | 6.0557E−08 | −2.5737E−09 | 5.3531E−11 | −4.4654E−13 |
| R18 | −9.7355E−01 | 2.7577E−07 | −7.9852E−09 | 1.2988E−10 | −9.0437E−13 | k represents a cone coefficient, and A4, A6, A8, A10, A12, A14, A16, A18, and A20 represent aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

In the equation (1), x represents a vertical distance between a point on an aspherical curve and the optic axis, and y represents an aspherical depth (a vertical distance between a point on an aspherical surface at a distance of x from the optic axis and a plane tangent to a vertex of the aspherical surface on the optic axis).

For convenience, the aspherical surface of each lens surface uses the aspherical surface shown in the above equation (1). However, the present invention is not limited to the aspherical polynomial form represented by the equation (1).

Table 3 and Table 4 show design data of inflection points and stagnation points of the lenses in the optical camera lens 10 according to Embodiment 1 of the present invention. P1R1 and P1R2 represent the object side surface and the image side surface of the first lens L1, respectively. P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 represent the object side surface and the image side surface of the fifth lens L5, respectively. P6R1 and P6R2 represent the object side surface and the image side surface of the sixth lens L6, respectively. P7R1 and P7R2 represent the object side surface and the image side surface of the seventh lens L7, respectively. P8R1 and P8R2 represent the object side surface and the image side surface of the eighth lens L8, respectively. P9R1 and P9R2 represent the object side surface and the image side surface of the ninth lens L9, respectively. Data corresponding to the "inflection point position" column is a vertical distance from the inflection point disposed on the surface of each lens to the optic axis of the optical camera lens 10. Data corresponding to the "stagnation point position" column is a vertical distance from the stagnation point disposed on the surface of each lens to the optic axis of the optical camera lens 10.

TABLE 3

| | Number of inflection points | Inflection point position 1 | Inflection point position 2 | Inflection point position 3 |
|---|---|---|---|---|
| P1R1 | 0 | / | / | / |
| P1R2 | 2 | 1.255 | 1.445 | / |
| P2R1 | 0 | / | / | / |
| P2R2 | 0 | / | / | / |
| P3R1 | 2 | 1.295 | 1.475 | / |
| P3R2 | 0 | / | / | / |
| P4R1 | 2 | 0.505 | 1.795 | / |
| P4R2 | 2 | 0.385 | 1.915 | / |
| P5R1 | 2 | 0.295 | 1.895 | / |
| P5R2 | 1 | 2.025 | / | / |
| P6R1 | 2 | 1.545 | 2.225 | / |
| P6R2 | 2 | 1.845 | 2.555 | / |
| P7R1 | 2 | 2.575 | 2.985 | / |
| P7R2 | 2 | 2.975 | 3.395 | / |
| P8R1 | 2 | 1.505 | 3.625 | / |
| P8R2 | 1 | 1.435 | / | / |
| P9R1 | 2 | 2.385 | 4.825 | / |
| P9R2 | 3 | 0.975 | 5.035 | 5.415 |

TABLE 4

| | Number of stagnation points | Stagnation point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 0.865 |
| P4R2 | 1 | 0.675 |
| P5R1 | 1 | 0.505 |
| P5R2 | 0 | / |
| P6R1 | 0 | / |
| P6R2 | 0 | / |
| P7R1 | 0 | / |
| P7R2 | 0 | / |
| P8R1 | 1 | 2.675 |
| P8R2 | 1 | 2.605 |
| P9R1 | 0 | / |
| P9R2 | 1 | 2.215 |

Figure 2:
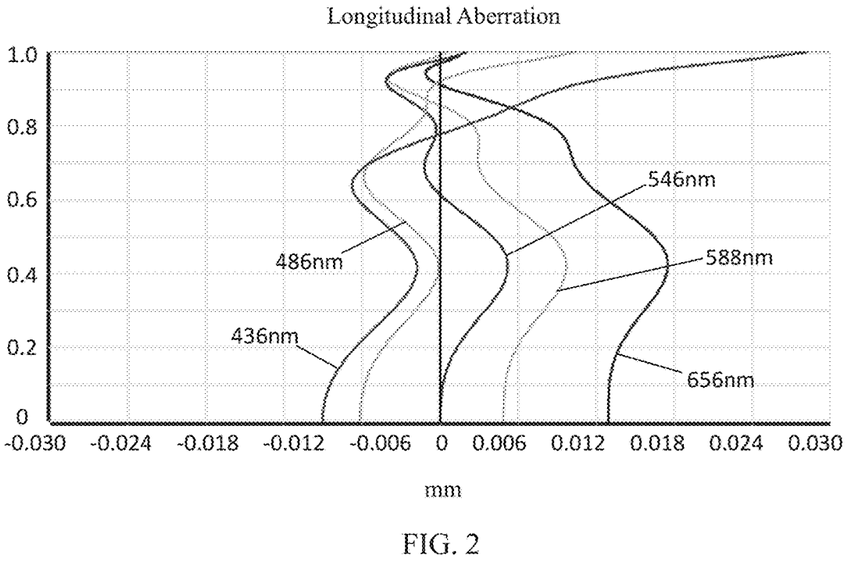
FIG. 2 is a schematic diagram of longitudinal aberration of the optical camera lens shown in FIG. 1.
Figure 3:
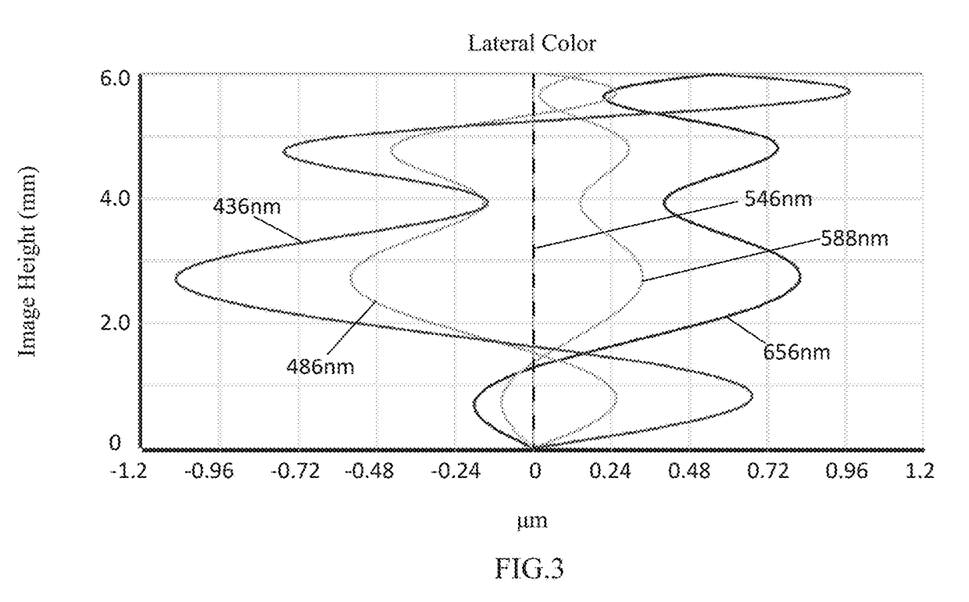
FIG. 3 is a schematic diagram of lateral color of the optical camera lens shown in FIG. 1.
Figure 4:
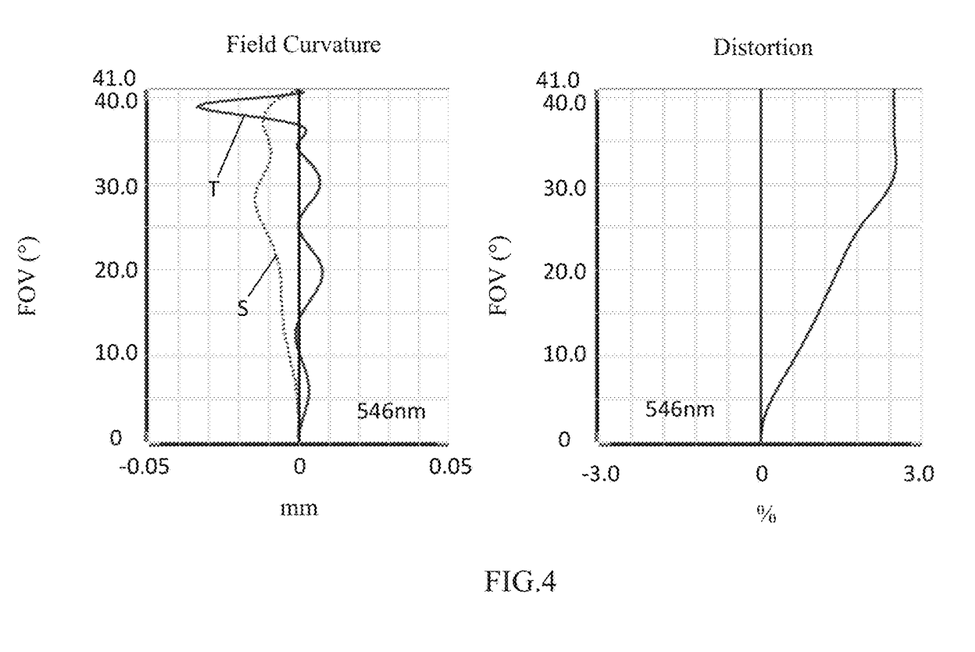
FIG. 4 is a schematic diagram of field curvature and distortion of the optical camera lens shown in FIG. 1.

FIG. 2 and FIG. 3 respectively show schematic diagrams of longitudinal aberration and lateral color after light with wavelengths of 656 nm, 588 nm, 546 nm, 486 nm, and 436 nm passes through the optical camera lens 10 in Embodiment 1. FIG. 4 shows a schematic diagram of field curvature and distortion of light with a wavelength of 546 nm after passing through the optical camera lens 10 in Embodiment 1. The field curvature S in FIG. 4 is field curvature in a sagittal direction, and T is field curvature in a meridian direction.

Table 13 below shows various values and values corresponding to parameters specified in the conditions for each of Embodiments 1, 2, and 3.

As shown in Table 13, Embodiment 1 satisfies the respective conditions.

In this embodiment, the optical camera lens 10 has an entrance pupil diameter ENPD of 3.962 mm, a full field of view image height IH of 6.000 mm, and a field of view FOV of 82.00° in a diagonal direction, so that the optical camera lens 10 meets design requirements of a large aperture, a wide angle, and ultra-thinness, has fully corrected on-axis and off-axis chromatic aberrations, and has excellent optical characteristics.

Embodiment 2

Figure 5:
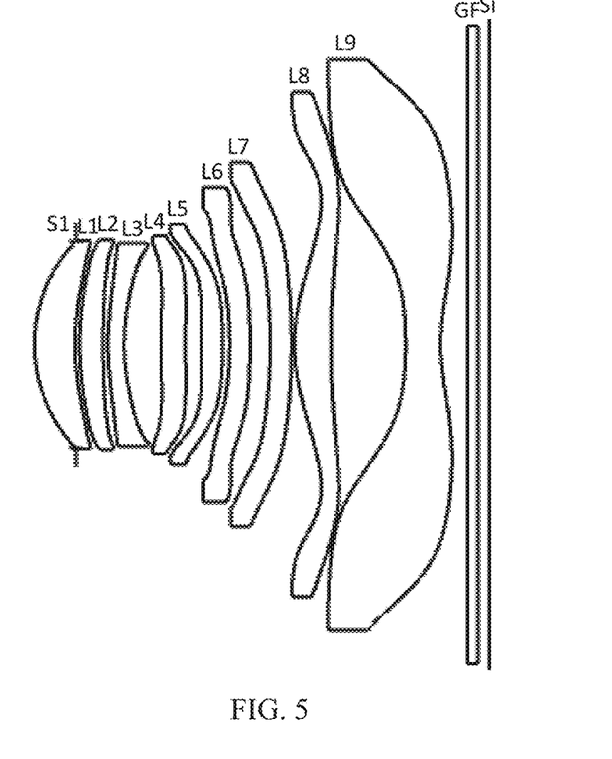
FIG. 5 is a schematic structural diagram of an optical camera lens according to Embodiment 2 of the present invention.

FIG. 5 illustrates an optical camera lens 20 according to Embodiment 2 of the present invention.

Embodiment 2 is basically the same as Embodiment 1. The meanings of the symbols are the same as those in Embodiment 1. Only differences from Embodiment 1 are listed below.

In this embodiment, the fourth lens L4 has a positive refractive power.

Table 5 and Table 6 show design data of the optical camera lens 20 according to Embodiment 2 of the present invention.

TABLE 5

| | R | d | | nd | | vd |
|---|---|---|---|---|---|---|
| S1 | ∞ | d0= | −0.772 | | | |
| R1 | 2.949 | d1= | 0.753 | nd1 | 1.5444 | v1 56.43 |
| R2 | 4.771 | d2= | 0.086 | | | |
| R3 | 5.491 | d3= | 0.440 | nd2 | 1.5444 | v2 56.43 |
| R4 | 17.913 | d4= | 0.094 | | | |

TABLE 5-continued

| | R | d | nd | | vd | |
|---|---|---|---|---|---|---|
| R5 | 5.643 | d5= 0.300 | nd3 | 1.6800 | v3 | 18.40 |
| R6 | 3.846 | d6= 0.683 | | | | |
| R7 | 22.468 | d7= 0.460 | nd4 | 1.5444 | v4 | 56.43 |
| R8 | 23.864 | d8= 0.298 | | | | |
| R9 | 35.040 | d9= 0.388 | nd5 | 1.5444 | v5 | 56.43 |
| R10 | −9.561 | d10= 0.133 | | | | |
| R11 | −6.013 | d11= 0.380 | nd6 | 1.6023 | v6 | 28.29 |
| R12 | −16.027 | d12= 0.381 | | | | |
| R13 | −9.89 | d13= 0.400 | nd7 | 1.6800 | v7 | 18.40 |
| R14 | −14.317 | d14= 0.055 | | | | |
| R15 | 3.632 | d15= 0.688 | nd8 | 1.5444 | v8 | 56.43 |
| R16 | 135.385 | d16= 1.373 | | | | |
| R17 | −9.894 | d17= 0.651 | nd9 | 1.5444 | v9 | 56.43 |
| R18 | 3.747 | d18= 0.500 | | | | |
| R19 | ∞ | d19= 0.210 | ndg | 1.5168 | vg | 64.17 |
| R20 | ∞ | d20= 0.202 | | | | |

Table 6 shows aspherical surface data of the lenses in the optical camera lens 20 according to Embodiment 2 of the present invention.

TABLE 6

| | Cone coefficient | Aspherical coefficient | | | | |
|---|---|---|---|---|---|---|
| | k | A4 | A6 | A8 | A10 | A12 |
| R1 | 8.2647E−02 | −2.2895E−04 | 1.9341E−04 | −5.5016E−05 | 1.8974E−05 | −3.4761E−06 |
| R2 | −4.6172E+00 | −9.9061E−04 | −3.0477E−03 | −4.7415E−04 | 7.5257E−04 | −2.2022E−04 |
| R3 | −8.9094E+00 | 4.0072E−03 | −4.1842E−03 | −5.7119E−05 | 6.9384E−04 | −1.6257E−04 |
| R4 | 1.0000E+01 | 1.7785E−04 | 2.8142E−03 | −1.4245E−03 | 3.7470E−04 | −4.3293E−06 |
| R5 | −2.9423E+00 | −2.1922E−02 | 8.5462E−03 | −3.0503E−03 | 4.8419E−04 | 2.5413E−05 |
| R6 | 1.5221E+00 | −2.4612E−02 | 6.1245E−03 | −1.5242E−03 | 6.9679E−05 | 9.5702E−05 |
| R7 | 1.0000E+01 | −1.3189E−02 | 2.8398E−03 | −3.2508E−03 | 1.3494E−03 | −4.1694E−04 |
| R8 | 9.6991E+00 | −2.4589E−02 | 1.1477E−02 | −1.0384E−02 | 5.2630E−03 | −1.6775E−03 |
| R9 | −1.1655E−01 | −3.1012E−02 | −7.6875E−03 | 1.2102E−02 | −1.3425E−02 | 7.6263E−03 |
| R10 | 4.8732E+00 | 1.9503E−02 | −5.7586E−02 | 3.6465E−02 | −1.6633E−02 | 5.7638E−03 |
| R11 | 5.6690E−01 | 4.45584E−02 | −7.3886E−02 | 4.9637E−02 | −1.8760E−02 | 4.5639E−03 |
| R12 | 5.8386E+00 | −1.5790E−03 | −3.4403E−02 | 3.0398E−02 | −1.3517E−02 | 3.5213E−03 |
| R13 | 5.9862E+00 | 2.8601E−03 | −1.2857E−03 | 2.4792E−03 | −1.6640E−03 | 4.9330E−04 |
| R14 | 1.0000E+01 | −9.9850E−03 | 8.0750E−03 | −2.8295E−03 | 4.4520E−04 | −3.0250E−05 |
| R15 | −6.4852E−01 | −9.6338E−03 | −2.3422E−03 | 9.4538E−04 | −1.6160E−04 | 1.4361E−05 |
| R16 | −1.0000E+01 | 2.5206E−02 | −1.2088E−02 | 3.0323E−03 | −4.5045E−04 | 4.0680E−05 |
| R17 | −1.0000E+01 | −3.2123E−02 | 3.3243E−03 | 5.5262E−05 | −3.2632E−05 | 2.8975E−06 |
| R18 | −9.1002E−01 | −3.5290E−02 | 5.7572E−03 | −7.2292E−04 | 6.6416E−05 | −4.2445E−06 |

| | Cone coefficient | Aspherical coefficient | | | |
|---|---|---|---|---|---|
| | k | A14 | A16 | A18 | A20 |
| R1 | 8.2647E−02 | 0.0000E+00 | 0.0000E+00 | 0.0000E+00 | 0.0000E+00 |
| R2 | −4.6172E+00 | 3.6163E−05 | −2.8040E−06 | 0.0000E+00 | 0.0000E+00 |
| R3 | −8.9094E+00 | 1.5451E−05 | 0.0000E+00 | 0.0000E+00 | 0.0000E+00 |
| R4 | 1.0000E+01 | −1.8196E−05 | 3.5845E−06 | 0.0000E+00 | 0.0000E+00 |
| R5 | −2.9423E+00 | −9.7738E−06 | 0.0000E+00 | 0.0000E+00 | 0.0000E+00 |
| R6 | 1.5221E+00 | −1.0962E−05 | 0.0000E+00 | 0.0000E+00 | 0.0000E+00 |
| R7 | 1.0000E+01 | 6.1367E−05 | −9.5712E−07 | 0.0000E+00 | 0.0000E+00 |
| R8 | 9.6991E+00 | 2.6425E−04 | −1.4377E−05 | 0.0000E+00 | 0.0000E+00 |
| R9 | −1.1655E−01 | −2.2864E−03 | 3.4764E−04 | −2.0946E−05 | 0.0000E+00 |
| R10 | 4.8732E+00 | −1.2765E−03 | 1.5254E−04 | −7.3765E−06 | 0.0000E+00 |
| R11 | 5.6690E−01 | −7.3649E−04 | 7.6515E−05 | −4.6323E−06 | 1.2317E−07 |
| R12 | 5.8386E+00 | −5.5007E−04 | 5.0648E−05 | −2.5379E−06 | 5.3448E−08 |
| R13 | 5.9862E+00 | −8.0303E−05 | 7.5744E−06 | −3.8971E−07 | 8.4508E−09 |
| R14 | 1.0000E+01 | 6.6053E−08 | 9.7130E−08 | −3.7848E−09 | 1.3696E−11 |
| R15 | −6.4852E−01 | −7.0404E−07 | 1.8757E−08 | −2.3829E−10 | 8.3307E−13 |
| R16 | −1.0000E+01 | −2.2543E−06 | 7.4787E−08 | −1.3605E−09 | 1.0408E−11 |
| R17 | −1.0000E+01 | −1.4030E−07 | 4.1191E−09 | −6.8863E−11 | 5.0121E−13 |
| R18 | −9.1002E−01 | 1.7891E−07 | −4.7152E−09 | 7.0457E−11 | −4.5602E−13 |

Table 7 and Table 8 show design data of inflection points and stagnation points of the lenses in the optical camera lens 20 according to Embodiment 2 of the present invention.

TABLE 7

| | Number of inflection points | Inflection point position 1 | Inflection point position 2 | Inflection point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 3 | 1.155 | 1.555 | 1.905 |
| P3R2 | 0 | / | / | / |
| P4R1 | 2 | 0.555 | 1.805 | / |
| P4R2 | 2 | 0.415 | 1.925 | / |
| P5R1 | 2 | 0.275 | 1.885 | / |
| P5R2 | 1 | 2.015 | / | / |
| P6R1 | 2 | 1.475 | 2.195 | / |
| P6R2 | 2 | 1.835 | 2.545 | / |
| P7R1 | 2 | 2.515 | 2.865 | / |

TABLE 7-continued

| | Number of inflection points | Inflection point position 1 | Inflection point position 2 | Inflection point position 3 |
|---|---|---|---|---|
| P7R2 | 2 | 3.005 | 3.315 | / |
| P8R1 | 3 | 1.555 | 3.625 | 4.425 |
| P8R2 | 3 | 1.605 | 4.315 | 4.585 |
| P9R1 | 2 | 2.325 | 4.855 | / |
| P9R2 | 2 | 0.955 | 5.035 | / |

TABLE 8

| | Number of stagnation points | Stagnation point position 1 | Stagnation point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 1 | 0.935 | / |
| P4R2 | 1 | 0.735 | / |
| P5R1 | 1 | 0.465 | / |
| P5R2 | 0 | / | / |
| P6R1 | 0 | / | / |
| P6R2 | 2 | 2.475 | 2.605 |
| P7R1 | 0 | / | / |
| P7R2 | 0 | / | / |
| P8R1 | 1 | 2.735 | / |
| P8R2 | 1 | 2.745 | / |
| P9R1 | 0 | / | / |
| P9R2 | 1 | 2.175 | / |

Figure 6:
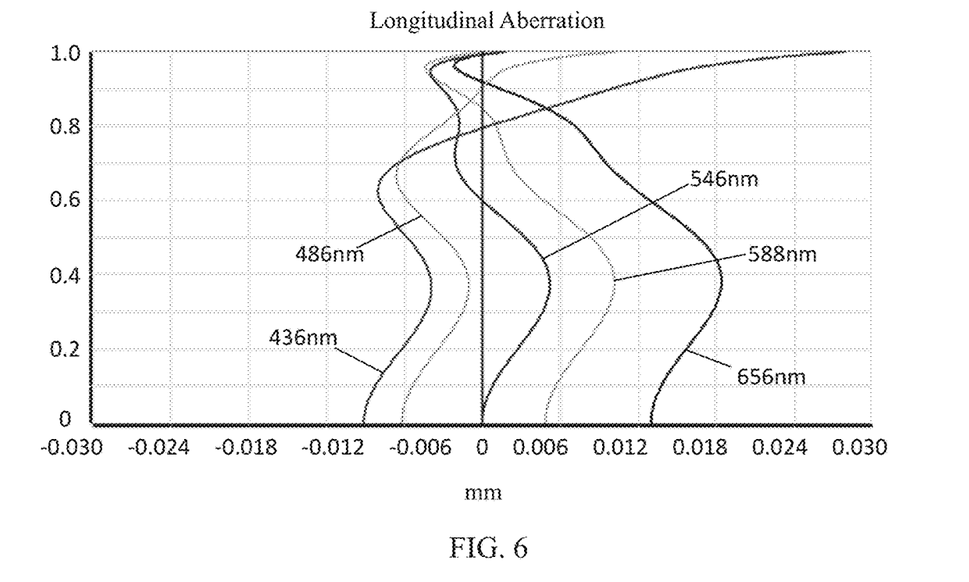
FIG. 6 is a schematic diagram of longitudinal aberration of the optical camera lens shown in FIG. 5.
Figure 7:
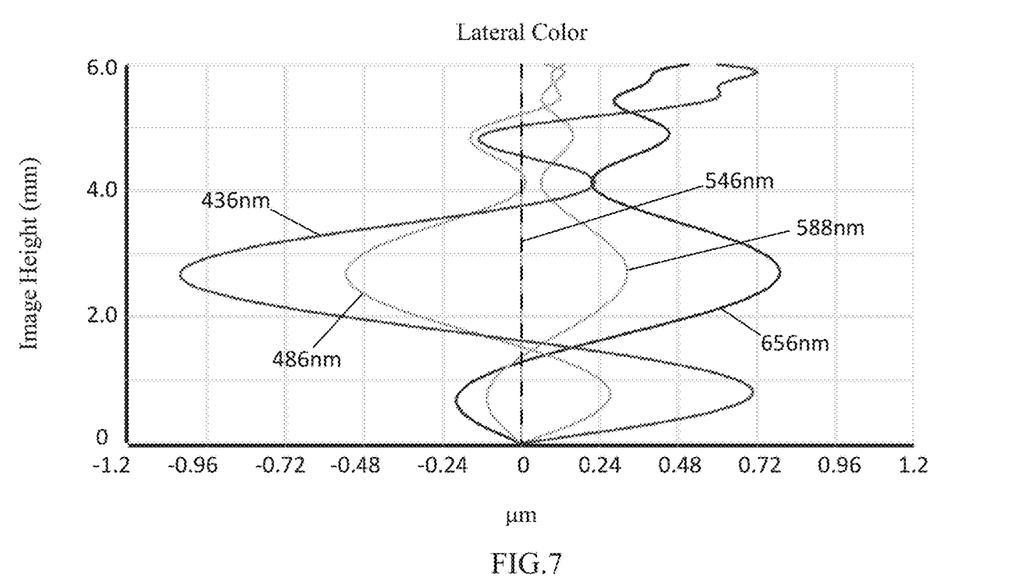
FIG. 7 is a schematic diagram of lateral color of the optical camera lens shown in FIG. 5.
Figure 8:
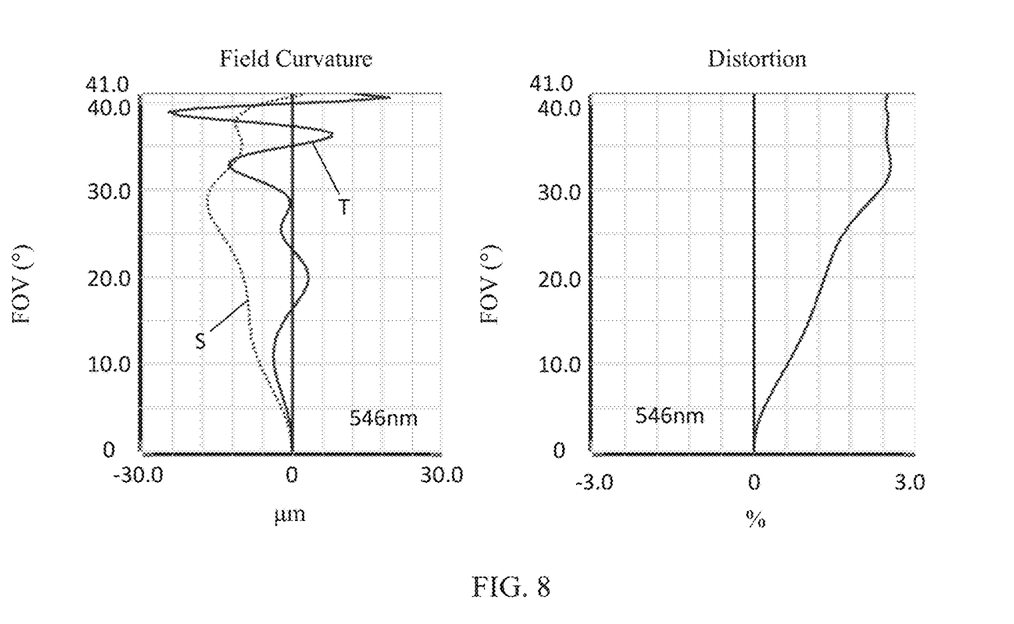
FIG. 8 is a schematic diagram of field curvature and distortion of the optical camera lens shown in FIG. 5.

FIG. 6 and FIG. 7 respectively show schematic diagrams of longitudinal aberration and lateral color after light with wavelengths of 656 nm, 588 nm, 546 nm, 486 nm, and 436 nm passed through the optical camera lens 20 in Embodiment 2. FIG. 8 shows a schematic diagram of field curvature and distortion after light with a wavelength of 546 nm passed through the optical camera lens 20 in Embodiment 2. The field curvature S in FIG. 8 is field curvature in a sagittal direction, and T is field curvature in a meridian direction.

As shown in Table 13, Embodiment 2 satisfies the respective conditions.

In this embodiment, the optical camera lens 20 has an entrance pupil diameter ENPD of 3.962 mm, a full field of view image height IH of 6.000 mm, and a field of view FOV of 82.00° in a diagonal direction, so that the optical camera lens 20 meets design requirements of a large aperture, a wide angle, and ultra-thinness, has fully corrected on-axis and off-axis aberrations, and has excellent optical characteristics.

Embodiment 3

Figure 9:
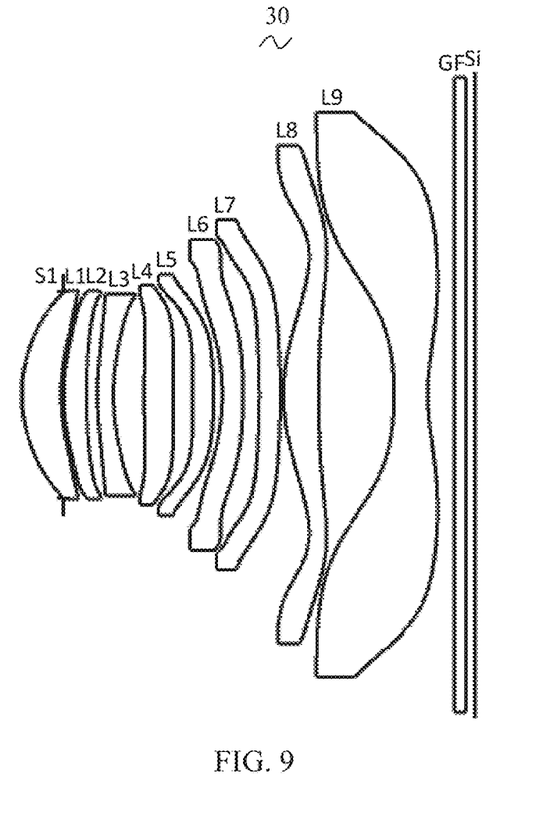
FIG. 9 is a schematic structural diagram of an optical camera lens according to Embodiment 3 of the present invention.

FIG. 9 illustrates an optical camera lens 30 according to Embodiment 3 of the present invention.

Embodiment 3 is basically the same as Embodiment 1. The meanings of the symbols are the same as those in Embodiment 1. Only differences from Embodiment 1 are listed below.

In this embodiment, the fourth lens L4 has a positive refractive power, and the seventh lens L7 has a positive refractive power.

Table 9 and Table 10 show design data of the optical camera lens 30 according to Embodiment 3 of the present invention.

TABLE 9

| | R | | d | nd | | vd |
|---|---|---|---|---|---|---|
| S1 | ∞ | d0= | -0.769 | | | |
| R1 | 2.954 | d1= | 0.728 | nd1 | 1.5444 | v1 | 56.43 |
| R2 | 3.607 | d2= | 0.054 | | | |
| R3 | 3.764 | d3= | 0.426 | nd2 | 1.5444 | v2 | 56.43 |
| R4 | 10.975 | d4= | 0.208 | | | |
| R5 | 5.979 | d5= | 0.300 | nd3 | 1.6800 | v3 | 18.40 |
| R6 | 4.114 | d6= | 0.581 | | | |
| R7 | 17.923 | d7= | 0.546 | nd4 | 1.5444 | v4 | 56.43 |
| R8 | 44.090 | d8= | 0.354 | | | |
| R9 | 37.775 | d9= | 0.401 | nd5 | 1.5444 | v5 | 56.43 |
| R10 | -9.401 | d10= | 0.162 | | | |
| R11 | -4.784 | d11= | 0.380 | nd6 | 1.6023 | v6 | 28.29 |
| R12 | -19.749 | d12= | 0.306 | | | |
| R13 | -15.448 | d13= | 0.400 | nd7 | 1.6800 | v7 | 18.40 |
| R14 | -13.266 | d14= | 0.055 | | | |
| R15 | 3.644 | d15= | 0.666 | nd8 | 1.5444 | v8 | 56.43 |
| R16 | 67.134 | d16= | 1.413 | | | |
| R17 | -7.388 | d17= | 0.632 | nd9 | 1.5444 | v9 | 56.43 |
| R18 | 4.188 | d18= | 0.500 | | | |
| R19 | ∞ | d19= | 0.210 | ndg | 1.5168 | vg | 64.17 |
| R20 | ∞ | d20= | 0.178 | | | |

Table 10 shows aspherical surface data of the lenses in the optical camera lens 30 according to Embodiment 3 of the present invention.

TABLE 10

| | Cone coefficient | Aspherical coefficient | | | | |
|---|---|---|---|---|---|---|
| | k | A4 | A6 | A8 | A10 | A12 |
| R1 | 6.8168E-02 | -7.4225E-04 | 4.3030E-04 | -1.1083E-04 | 3.9696E-05 | -6.5848E-06 |
| R2 | -6.6345E+00 | -3.4748E-03 | 4.0273E-04 | -3.4436E-03 | 1.8092E-03 | -3.8413E-04 |
| R3 | -9.9320E+00 | 4.0479E-03 | -2.2256E-03 | -2.0304E-03 | 1.2826E-03 | -2.2126E-04 |
| R4 | 1.5892E+00 | -5.4110E-03 | 5.7995E-03 | -2.1272E-03 | 5.3359E-04 | -7.2779E-05 |
| R5 | -3.6743E+00 | -2.4707E-02 | 9.3509E-03 | -2.5808E-03 | 9.8048E-05 | 1.1959E-04 |
| R6 | 1.6306E+00 | -2.4506E-02 | 6.8074E-03 | -1.4014E-03 | -1.5935E-03 | 1.6149E-04 |
| R7 | 5.0546E+00 | -1.0075E-02 | 1.3918E-03 | -1.5379E-03 | 5.4772E-04 | -1.9026E-04 |
| R8 | -1.9588E+00 | -1.7963E-02 | 4.6487E-03 | -4.6593E-03 | 2.4545E-03 | -8.3464E-04 |
| R9 | -5.7445E+00 | -2.2091E-02 | -1.5810E-02 | 1.6525E-02 | -1.4873E-02 | 7.6071E-03 |
| R10 | 8.2475E+00 | 1.3463E-02 | -4.8855E-02 | 3.2377E-02 | -1.5867E-02 | 5.6437E-03 |
| R11 | 1.7270E-01 | 2.3619E-02 | -5.6498E-02 | 4.6895E-02 | -2.1021E-02 | 5.9658E-03 |
| R12 | 9.7603E+00 | -1.6144E-02 | -2.9166E-02 | 3.0770E-02 | -1.3962E-02 | 3.5261E-03 |
| R13 | 9.3875E+00 | 1.5682E-02 | -1.4966E-02 | 7.7967E-03 | -2.7219E-03 | 6.1374E-04 |
| R14 | 9.7757E+00 | 1.0177E-02 | -1.9600E-03 | -1.7112E-03 | 1.0613E-03 | -2.9542E-04 |
| R15 | -6.3675E-01 | -1.1150E-02 | -6.6244E-04 | 3.5976E-04 | -6.0877E-05 | 3.9294E-06 |
| R16 | -3.0187E+00 | 1.4776E-02 | -5.7684E-03 | 1.3812E-03 | -2.1263E-04 | 1.9963E-05 |

TABLE 10-continued

| | | | | | |
|---|---|---|---|---|---|
| R17 | −9.9390E+00 | −3.2206E−02 | 4.3727E−03 | −1.4941E−04 | −1.5901E−05 | 2.1992E−06 |
| R18 | −8.5150E−01 | −3.2880E−02 | 5.7796E−03 | −7.8871E−04 | 7.8468E−05 | −5.4092E−06 |

| | Cone coefficient | Aspherical coefficient | | | |
|---|---|---|---|---|---|
| | k | A14 | A16 | A18 | A20 |
| R1 | 6.8168E−02 | 0.0000E+00 | 0.0000E+00 | 0.0000E+00 | 0.0000E+00 |
| R2 | −6.6345E+00 | 4.3798E−05 | −2.5662E−06 | 0.0000E+00 | 0.0000E+00 |
| R3 | −9.9320E+00 | 1.6254E−05 | 0.0000E+00 | 0.0000E+00 | 0.0000E+00 |
| R4 | 1.5892E+00 | 3.4186E−06 | 1.5286E−06 | 0.0000E+00 | 0.0000E+00 |
| R5 | −3.6743E+00 | −1.7655E−05 | 0.0000E+00 | 0.0000E+00 | 0.0000E+00 |
| R6 | 1.6306E+00 | −1.7629E−05 | 0.0000E+00 | 0.0000E+00 | 0.0000E+00 |
| R7 | 5.0546E+00 | 2.9805E−05 | −6.1868E−08 | 0.0000E+00 | 0.0000E+00 |
| R8 | −1.9588E+00 | 1.3292E−04 | −6.8440E−06 | 0.0000E+00 | 0.0000E+00 |
| R9 | −5.7445E+00 | −2.1298E−03 | 3.0823E−04 | −1.7884E−05 | 0.0000E+00 |
| R10 | 8.2475E+00 | −1.2341E−03 | 1.4365E−04 | −6.7470E−06 | 0.0000E+00 |
| R11 | 1.7270E−01 | −1.1003E−03 | 1.2742E−04 | −8.3856E−06 | 2.3747E−07 |
| R12 | 9.7603E+00 | −5.2100E−04 | 4.4586E−05 | −2.0374E−06 | 3.8112E−08 |
| R13 | 9.3875E+00 | −9.4187E−05 | 9.6219E−06 | −5.7225E−07 | 1.4522E−08 |
| R14 | 9.7757E+00 | 4.6102E−05 | −4.1192E−06 | 1.9741E−07 | −3.9443E−09 |
| R15 | −6.3675E−01 | −2.0509E−08 | −8.7780E−09 | 3.7967E−10 | −5.0077E−12 |
| R16 | −3.0187E+00 | −1.1372E−06 | 3.8419E−08 | −7.0707E−10 | 5.4422E−12 |
| R17 | −9.9390E+00 | −1.2603E−07 | 4.0496E−09 | −7.1103E−11 | 5.3126E−13 |
| R18 | −8.5150E−01 | 2.4522E−07 | −6.9224E−09 | 1.1001E−10 | −7.5007E−13 |

Table 11 and Table 12 show design data of inflection points and stagnation points of the lenses in the optical camera lens 30 according to Embodiment 3 of the present invention.

TABLE 11

| | Number of inflection points | Inflection point position 1 | Inflection point position 2 | Inflection point position 3 |
|---|---|---|---|---|
| P1R1 | 0 | / | / | / |
| P1R2 | 2 | 1.135 | 1.545 | / |
| P2R1 | 0 | / | / | / |
| P2R2 | 0 | / | / | / |
| P3R1 | 3 | 1.065 | 1.615 | 1.895 |
| P3R2 | 0 | / | / | / |
| P4R1 | 2 | 0.705 | 1.825 | / |
| P4R2 | 2 | 0.335 | 1.975 | / |
| P5R1 | 2 | 0.305 | 1.905 | / |
| P5R2 | 1 | 2.035 | / | / |
| P6R1 | 2 | 1.455 | 2.155 | / |
| P6R2 | 2 | 1.895 | 2.565 | / |
| P7R1 | 2 | 2.495 | 2.795 | / |
| P7R2 | 2 | 2.855 | 3.285 | / |
| P8R1 | 3 | 1.575 | 3.545 | 4.345 |
| P8R2 | 3 | 1.975 | 4.115 | 4.465 |
| P9R1 | 2 | 2.285 | 4.825 | / |
| P9R2 | 2 | 0.955 | 5.065 | / |

TABLE 12

| | Number of stagnation points | Stagnation point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 1.145 |
| P4R2 | 1 | 0.585 |
| P5R1 | 1 | 0.505 |
| P5R2 | 0 | / |
| P6R1 | 0 | / |
| P6R2 | 0 | / |

TABLE 12-continued

| | Number of stagnation points | Stagnation point position 1 |
|---|---|---|
| P7R1 | 0 | / |
| P7R2 | 0 | / |
| P8R1 | 1 | 2.655 |
| P8R2 | 1 | 2.715 |
| P9R1 | 0 | / |
| P9R2 | 1 | 2.205 |

Figure 10:
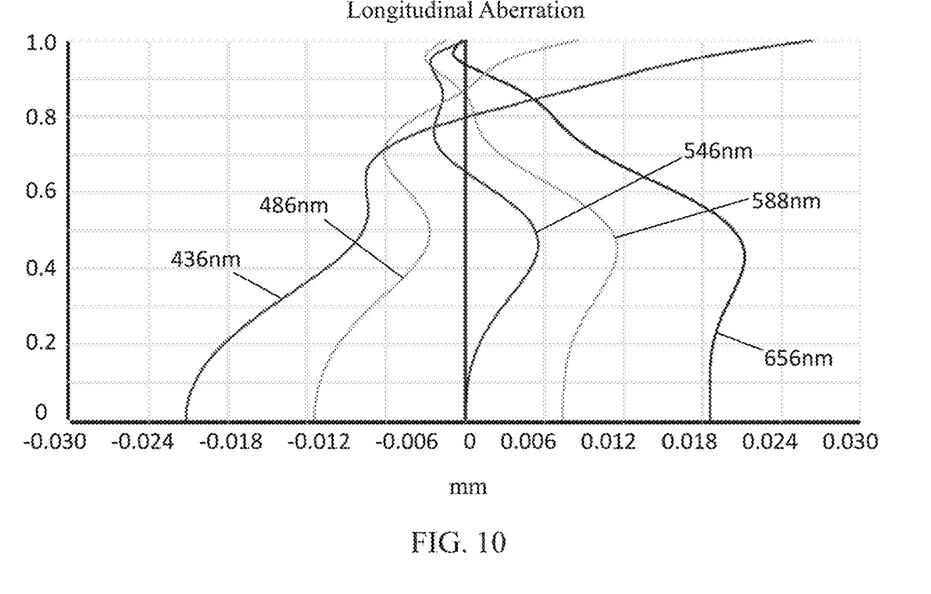
FIG. 10 is a schematic diagram of longitudinal aberration of the optical camera lens shown in FIG. 9.
Figure 11:
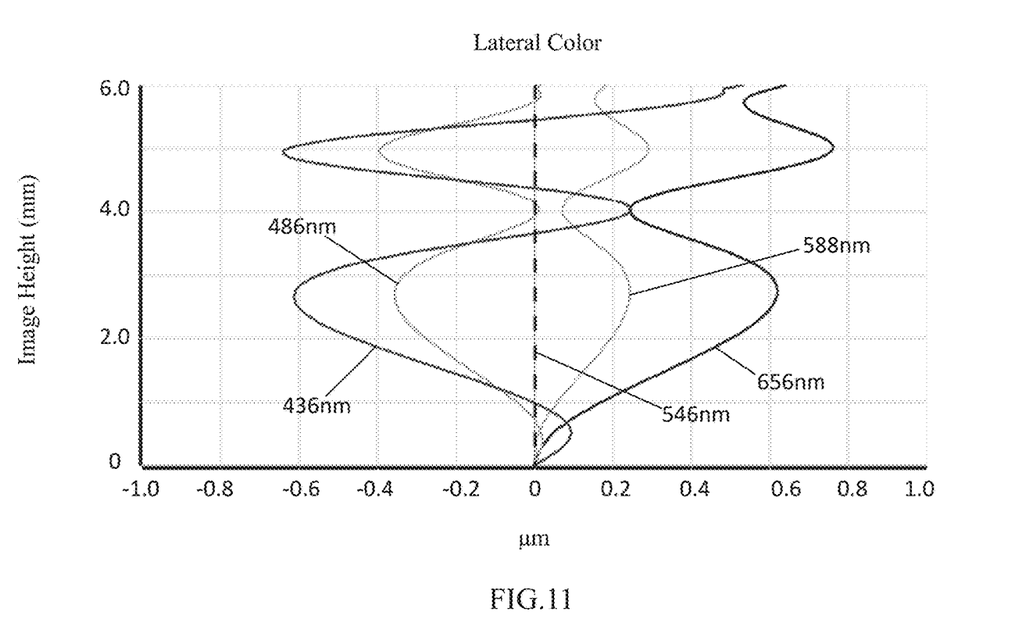
FIG. 11 is a schematic diagram of lateral color of the optical camera lens shown in FIG. 9.
Figure 12:
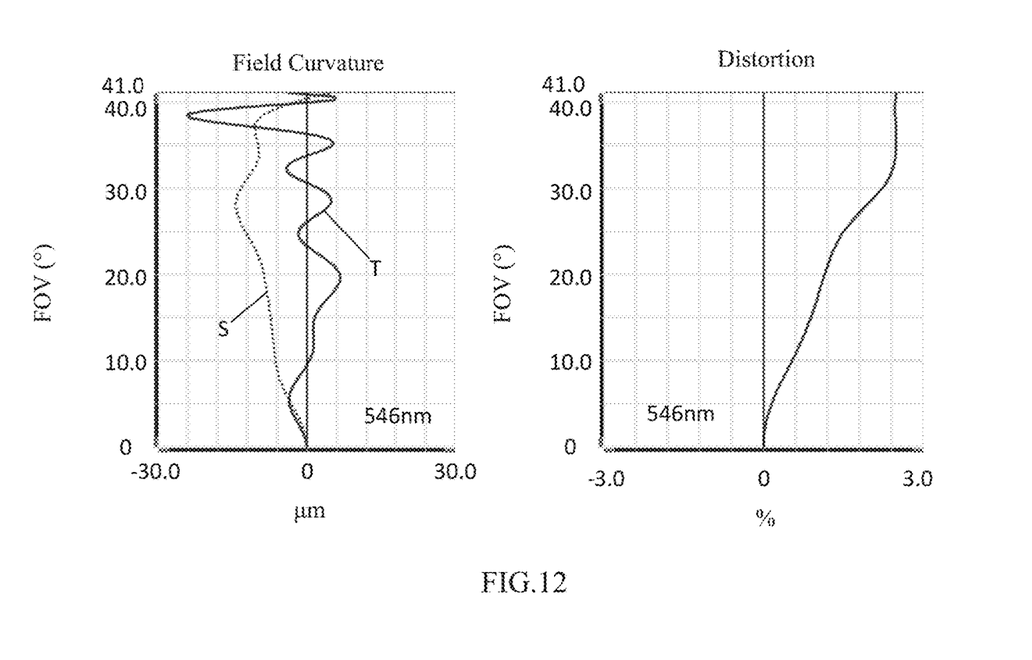
FIG. 12 is a schematic diagram of field curvature and distortion of the optical camera lens shown in FIG. 9.

FIG. 10 and FIG. 11 respectively show schematic diagrams of longitudinal aberration and lateral color after light with wavelengths of 656 nm, 588 nm, 546 nm, 486 nm, and 436 nm passed through the optical camera lens 30 in Embodiment 3. FIG. 12 shows a schematic diagram of field curvature and distortion after of light with a wavelength of 546 nm passed through the optical camera lens 30 in Embodiment 3. The field curvature S in FIG. 12 is field curvature in a sagittal direction, and T is field curvature in a meridian direction.

Table 13 below lists values corresponding to the parameters specified in the conditions for this embodiment. Apparently, the optical camera lens 30 in this embodiment satisfies the above conditions.

In this embodiment, the optical camera lens 30 has an entrance pupil diameter ENPD of 3.962 mm, a full field of view image height IH of 6.000 mm, and a field of view FOV of 82.00° in a diagonal direction, so that the optical camera lens 30 meets design requirements of a large aperture, a wide angle, and ultra-thinness, has fully corrected on-axis and off-axis chromatic aberration, and has excellent optical characteristics.

TABLE 13

| Parameters and conditions | Embodiment 1 | Embodiment 2 | Embodiment 3 |
|---|---|---|---|
| f1/f | 2.57 | 1.83 | 3.18 |
| d3/d4 | 7.94 | 4.68 | 2.05 |
| f | 6.735 | 6.734 | 6.734 |
| f1 | 17.329 | 12.323 | 21.403 |

TABLE 13-continued

| Parameters and conditions | Embodiment 1 | Embodiment 2 | Embodiment 3 |
|---|---|---|---|
| f2 | 10.440 | 14.306 | 10.263 |
| f3 | −18.863 | −18.813 | −20.494 |
| f4 | −1088.954 | 629.414 | 54.836 |
| f5 | 13.638 | 13.782 | 13.810 |
| f6 | −16.698 | −16.078 | −10.496 |
| f7 | −47.725 | −48.226 | 126.852 |
| f8 | 6.897 | 6.815 | 7.023 |
| f9 | −4.902 | −4.889 | −4.797 |
| f12 | 6.867 | 6.899 | 7.350 |
| FNO | 1.70 | 1.70 | 1.70 |
| TTL | 8.476 | 8.475 | 8.500 |
| IH | 6.000 | 6.000 | 6.000 |
| FOV | 82.00° | 82.00° | 82.00° |

Those of ordinary skill in the art can understand that the above embodiments are exemplary embodiments for implementing the present invention. In actual applications, various changes can be made to the forms and details thereof without departing from the scope of the present invention.

What is claimed is:

1. An optical camera lens, comprising, from an object side to an image side:
   a first lens;
   a second lens having a positive refractive power;
   a third lens;
   a fourth lens;
   a fifth lens;
   a sixth lens;
   a seventh lens;
   an eighth lens; and
   a ninth lens,
   wherein the optical camera lens satisfies following conditions:

$1.80 \leq f1/f \leq 3.20$;

$2.50 \leq R12/R11 \leq 4.50$; and $2.00 \leq d3/d4 \leq 8.00$, where f denotes a focal length of the optical camera lens, f1 denotes a focal length of the first lens, R11 denotes a central curvature radius of an object side surface of the sixth lens, R12 denotes a central curvature radius of an image side surface of the sixth lens: d3 denotes an on-axis thickness of the second lens, and d4 denotes an on-axis distance from an image side surface of the second lens to an object side surface of the third lens.

2. The optical camera lens as described in claim 1, further satisfying following conditions:

$-20.09 \leq (R1+R2)/(R1-R2) \leq -2.82$; and $0.04 \leq d1/TTL \leq 0.13$, where R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

3. The optical camera lens as described in claim 1, further satisfying following conditions:

$0.76 \leq f2/f \leq 3.19$;

$-4.09 \leq (R3+R4)/(R3-R4) \leq -1.10$; and $0.03 \leq d3/TTL \leq 0.09$, where f2 denotes a focal length of the second lens, R3 denotes a central curvature radius of an object side surface of the second lens, R4 denotes a central curvature radius of the image side surface of the second lens, and TTL denotes a total optical length from an object side surface of the first lens to an image plane of the camera optical lens along an optic axis.

4. The optical camera lens as described in claim 1, further satisfying following conditions:

$-6.09 \leq f3/f \leq -1.86$;

$2.64 \leq (R5+R6)/(R5-R6) \leq 8.12$; and $0.02 \leq d5/TTL \leq 0.05$, where f3 denotes a focal length of the third lens, R5 denotes a central curvature radius of the object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

5. The optical camera lens as described in claim 1, further satisfying following conditions:

$-323.37 \leq f4/f \leq 140.20$;

$-66.38 \leq (R7+R8)/(R7-R8) \leq 61.43$; and $0.03 \leq d7/TTL \leq 0.10$, where f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

6. The optical camera lens as described in claim 1, further satisfying following conditions:

$1.01 \leq f5/f \leq 3.08$;

$0.22 \leq (R9+R10)/(R9-R10) \leq 0.90$; and $0.02 \leq d9/TTL \leq 0.07$, where f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis.

7. The optical camera lens as described in claim 1, further satisfying following conditions:

$-4.96 \leq f6/f \leq -1.04$;

$-4.66 \leq (R11+R12)/(R11-R12) \leq -1.09$; and $0.02 \leq d11/TTL \leq 0.07$, where f6 denotes a focal length of the sixth lens, R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object side surface of the first lens to an image plane of the camera optical lens along an optic axis.

8. The optical camera lens as described in claim 1, further satisfying following conditions:

$-14.32 \leq f7/f \leq 28.26;$ $-10.94 \leq (R13+R14)/(R13-R14) \leq 19.74;$ and $0.02 \leq d13/TTL \leq 0.07,$ where f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens, and TTL denotes a total optical length from an object side surface of the first lens to an image plane of the camera optical lens along an optic axis.

9. The optical camera lens as described in claim 1, further satisfying following conditions:

$0.51 \leq f8/f \leq 1.56;$ $-2.23 \leq (R15+R16)/(R15-R16) \leq -0.69;$ and $0.04 \leq d15/TTL \leq 0.12,$ where f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens, and TTL denotes a total optical length from an object side surface of the first lens to an image plane of the camera optical lens along an optic axis.

10. The optical camera lens as described in claim 1, further satisfying following conditions:

$-1.46 \leq f9/f \leq -0.47;$ $0.14 \leq (R17+R18)/(R17-R18) \leq 0.68;$ and $0.04 \leq d17/TTL \leq 0.12,$ where f9 denotes a focal length of the ninth lens, R17 denotes a central curvature radius of an object side surface of the ninth lens, R18 denotes a central curvature radius of an image side surface of the ninth lens, d17 denotes an on-axis thickness of the ninth lens, and TL denotes a total optical length from an object side surface of the first lens to an image plane of the camera optical lens along an optic axis.

* * * * *